US012786071B2

(12) United States Patent
Cherrington

(10) Patent No.: US 12,786,071 B2
(45) Date of Patent: Nov. 3, 2026

(54) NETWORK CUT ANALYSIS USING GPU ACCELERATION

(71) Applicant: Ciena Corporation, Hanover, MD (US)

(72) Inventor: John Wade Cherrington, Salt Spring Island (CA)

(73) Assignee: Ciena Corporation, Fulton, MD (US)

( * ) Notice: Subject to any disclaimer, the term of this patent is extended or adjusted under 35 U.S.C. 154(b) by 60 days.

(21) Appl. No.: 18/971,776

(22) Filed: Dec. 6, 2024

(65) Prior Publication Data

US 2026/0163807 A1 Jun. 11, 2026

(51) Int. Cl.
*H04L 41/147* (2022.01)
*H04L 41/14* (2022.01)

(52) U.S. Cl.
CPC .......... *H04L 41/147* (2013.01); *H04L 41/145* (2013.01)

(58) Field of Classification Search
CPC ............................ H04L 41/147; H04L 41/145
See application file for complete search history.

(56) References Cited

U.S. PATENT DOCUMENTS 6,574,669 B1 * 6/2003 Weaver ................. H04L 45/243 370/254
7,313,630 B1 * 12/2007 Nucci ..................... H04L 45/00 709/241
7,353,294 B1 * 4/2008 Nucci ................... H04L 45/123 370/238.1
7,756,043 B1 * 7/2010 Nucci ................... H04L 41/147 370/252
11,277,330 B1 3/2022 Cherrington et al.
11,362,903 B2 6/2022 Jain et al.
11,405,260 B2 * 8/2022 A ........................ H04L 41/5054
11,405,296 B1 * 8/2022 Evans ................... H04L 41/147
11,489,758 B1 11/2022 Jain et al.
11,582,135 B2 2/2023 Jain et al.
11,616,708 B1 * 3/2023 Chraim ................... H04L 43/10 709/238
11,683,260 B2 6/2023 Amiri et al.
12,068,923 B2 8/2024 Jain et al.
12,418,897 B1 * 9/2025 Banuli Nanje Gowda ................. H04W 84/047
2004/0202111 A1 * 10/2004 Beshai .................... H04L 45/00 370/237
2008/0133288 A1 * 6/2008 Thibaux ................. G06Q 10/04 714/26
2010/0306290 A1 * 12/2010 Zhang ................... G06F 18/213 708/290

(Continued)

*Primary Examiner* — Michael Won
(74) *Attorney, Agent, or Firm* — Baratta Law PLLC; Lawrence A. Baratta, Jr.

(57) ABSTRACT

Systems and methods include for network cut analysis include storing a routing matrix and a traffic matrix in processing hardware that is configured for matrix multiplication; receiving a request from a controller for one or more cuts in the network with the one or more cuts represented in a path-selective traffic vector that is used to mask out any of the plurality of links associated with the one or more cuts and to shape the traffic demands between router pairs; multiplying the path-selective traffic vector by the traffic matrix to obtain a refined traffic matrix due to the one or more cuts; and multiplying the routing matrix by the refined traffic matrix to obtain a link loading vector representing traffic on each of the plurality of links based on the one or more cuts.

20 Claims, 7 Drawing Sheets

(56) References Cited

U.S. PATENT DOCUMENTS

| | | | | |
|---|---|---|---|---|
| 2022/0222397 | A1* | 7/2022 | Jain | G06F 13/24 |
| 2022/0231938 | A1 | 7/2022 | Jain et al. | |
| 2023/0231783 | A1 | 7/2023 | Amiri et al. | |

* cited by examiner

A rectangular matrix of dimensions $(R, C)$ where $R < L$ can always be divided into $C/R$ square matrices with a residual submatrix $Res$. When we do the same to the vector $V$, we can realize the original matrix multiplication as $C/R$ operations that are simply added together.

We define $P_1$ as our first parallelism vector:

$P_1 = C/R$

Taking advantage of square sub-matrix parallelism for multi-GPU scale-out

NETWORK CUT ANALYSIS USING GPU ACCELERATION

FIELD OF THE DISCLOSURE

The present disclosure relates generally to networking and computing. More particularly, the present disclosure relates to systems and methods for a network cut analysis using graphics processing unit (GPU) acceleration.

BACKGROUND OF THE DISCLOSURE

A network cut analysis evaluates how a network behaves when one or more links or nodes are removed, either intentionally or due to failure. This process is a critical aspect of network planning and management, as it helps identify vulnerabilities and ensure resilience. When a network experiences such a "cut," it might not result in a total disconnection but can lead to significant performance challenges. For example, even if the network remains connected, it may experience congestion or approach conditions where congestion becomes imminent, impacting overall performance and user experience. Network cut analysis involves simulating and analyzing the effects of these disruptions to understand how the network handles traffic rerouting, load redistribution, and service quality under stress. It is integral to failure analysis, where engineers assess how well the network can sustain operations during partial failures or degraded conditions. This analysis is essential for identifying potential bottlenecks and planning for redundancy and robustness in network design. The insights gained from network cut analysis play a pivotal role in optimizing multi-layer networks. By evaluating the impact of different "cut" scenarios, network designers can determine optimal link sizing, topology adjustments, and physical layer routing strategies to mitigate risks. Moreover, the ability to quickly and accurately determine congestion levels under various cut conditions makes this process a critical, rate-limiting step in broader optimization efforts. Such efforts may include exploring trade-offs between cost, performance, and reliability, ensuring that the network remains efficient and resilient against potential disruptions.

BRIEF SUMMARY OF THE DISCLOSURE

The present disclosure relates to systems and methods for a network cut analysis using graphics processing unit (GPU) acceleration. CPU-based analysis for network cuts faces significant limitations due to its inefficiency in handling computationally intensive tasks like iterative path computations and large-scale matrix-vector multiplications. These operations are central to simulating network cuts and evaluating congestion scenarios, but they become increasingly burdensome as network size and complexity grow. Multi-core CPUs can parallelize some of this workload, but their use comes at a cost. In multi-layer, multi-objective network optimization workflows, CPU cores are needed for a variety of tasks, such as link sizing and higher-level optimizations like photonic route planning. Allocating CPU resources to network cut analysis diverts them from these tasks, creating opportunity costs and slowing overall optimization processes.

GPUs, on the other hand, offer a compelling solution for accelerating network cut analysis. With their massively parallel architecture, GPUs excel at handling the matrix-vector operations and parallel path computations that are central to this problem. Unlike CPUs, which are designed for general-purpose computing and have fewer cores optimized for sequential tasks, GPUs are specifically built to perform many operations simultaneously, making them ideal for computationally intensive scenarios. By offloading these tasks to GPUs, networks can achieve significant speedups in analysis, enabling faster evaluations of congestion and cut scenarios. This acceleration not only reduces computational overhead but also frees up CPU resources for other critical optimization tasks, creating a more efficient and scalable approach to network planning and management.

In various embodiments, the present disclosure includes a method having steps, a system with circuitry configured to implement the steps, and a non-transitory computer-readable medium storing instructions that, when executed, cause processing circuitry to implement the steps. The steps include storing a routing matrix and a traffic matrix in processing hardware that is configured for matrix multiplication, wherein the routing matrix represents a topology of a network of a plurality of routers interconnected by a plurality of links, and wherein the traffic matrix includes traffic demands between router pairs of the plurality of routers; receiving a request from a controller for one or more cuts in the network with the one or more cuts represented in a path-selective traffic vector that is used to mask out any of the plurality of links associated with the one or more cuts and to shape the traffic demands between router pairs; multiplying the path-selective traffic vector by the traffic matrix to obtain a refined traffic matrix due to the one or more cuts; and multiplying the routing matrix by the refined traffic matrix to obtain a link loading vector representing traffic on each of the plurality of links based on the one or more cuts. The steps can further include providing the link loading vector to the controller.

In an embodiment, the processing hardware includes one or more graphics processing units (GPUs) and the controller is implemented in one or more central processing units (CPUs). The routing can include includes rows corresponding to links, columns to router pairs, and binary entries indicating whether a specific link is part of a given router pair's path, and wherein the traffic matrix can encode the traffic demand between router pairs, replicated to align with the routing matrix columns. The traffic demands can be Layer 3 (L3) Internet Protocol (IP) traffic between the routers, and wherein the plurality of links can be optical connections at Layer 0 (L0). The multiplying can utilize sparse-matrix vector multiplication (SpMV) with parallelizes computations by leveraging sparsity, focusing processing power only on non-zero elements, based on a size of the network. The storing can include dividing the routing matrix and the traffic matrix into a plurality of square matrices and a residual matrix, based on a size of the network. The network can multiple layers, and the steps can further include utilizing a dependency graph to model fault propagation between the multiple layers where nodes in the dependency graph represent network elements and edges capture a dependency relationship between the network elements, such that a fault on a lower layer identifies upper layer impact.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Figure 1:
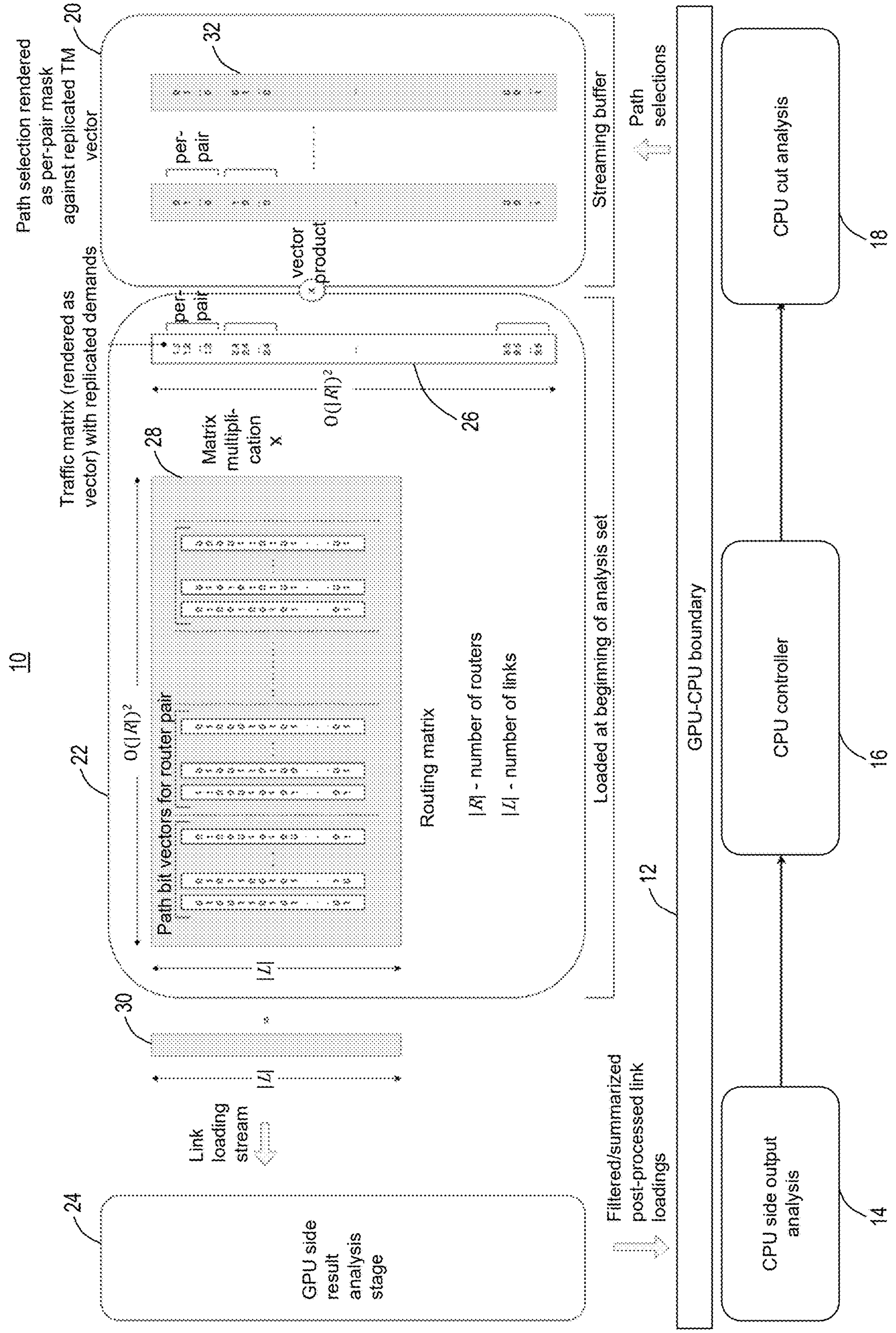
FIG. 1 illustrates a logical diagram of a system for Layer 3 (L3) congestion evaluation under a path selection stream.

Conventional approaches to network cut analysis face significant limitations, particularly in their computational efficiency and resource allocation. Two common approaches to network cut analysis are k-cuts analysis with individual Path Computation Element (PCE) calls per scenario and path-cache Internet Protocol (IP) techniques analyzed sequentially by the CPU. The k-cuts approach is widely used for network cut analysis and involves dynamically calculating paths for each cut scenario by making PCE calls. These calls exclude specific links or nodes to simulate cut structures and determine the resulting paths. While this method is straightforward and highly flexible, it is inherently computationally expensive. Each scenario requires a separate PCE computation, leading to inefficiencies, particularly in large or complex networks with numerous potential cuts. The iterative nature of k-cut optimizations compounds this issue, as the optimization loop must repeatedly compute paths for various excluded edges, significantly increasing time and resource consumption. This scalability challenge makes the approach less practical for networks requiring frequent or extensive failure analysis.

The path-cache IP technique adopts a proactive approach by precomputing and storing paths for various network configurations, allowing these cached paths to be reused during cut analysis. This reduces the need for repeated PCE calls, offering improved efficiency compared to methods like k-cuts. However, the analysis in this approach is typically performed sequentially by the CPU, which limits scalability. The sequential processing and heavy reliance on CPU resources create significant bottlenecks, as CPUs struggle to handle the computationally intensive matrix-vector multiplications required to analyze multiple cached paths for numerous cut scenarios. Each matrix represents a network state or configuration, and each vector corresponds to traffic or capacity, leading to combinatorial growth in the number of operations. While more efficient than k-cuts in some respects, the path-cache IP technique remains constrained by challenges in computational speed and resource optimization, particularly when deployed in large-scale or complex networks.

Prior work has shown that all-pairs k-shortest paths, covering 1, 2, . . . k-cuts from a reference path (e.g., the shortest path under a given weight scheme), can be precomputed with high efficiency compared to naïve approaches, k being an integer greater than or equal to 1. This method forms the basis of a path-cache approach and simplifies whole-network optimization by materializing paths during the optimization process itself. Consequently, core network calculations rarely need to return to the PCE, except in rare or bounded cases when specific corner scenarios arise. This proactive caching strategy provides general simplification and computational efficiencies, making it a strong foundation for optimization frameworks.

However, in the specific context of k-cut congestion analysis, simply having precomputed, cut-resilient paths in cache is not sufficient. The analysis requires a large number of link-loading calculations corresponding to various scenarios where paths are selectively masked to reflect the "knock-out" of certain links or nodes, forcing traffic to fail over to the next-best available paths. These calculations involve substantial matrix-vector operations, making the problem throughput-limited and computationally intensive, especially when performed sequentially on CPUs.

While multi-core CPUs can theoretically parallelize some of these tasks, their general-purpose nature limits their effectiveness in this context, as they are often required for other tasks in multi-layer optimization workflows, such as link sizing or photonic route optimization. Allocating CPU cores to network cut analysis diverts them from these tasks, creating opportunity costs and reducing overall efficiency. In contrast, the throughput-limited nature of this problem makes it particularly well-suited to modern GPUs. GPUs excel in parallelizing large-scale matrix-vector operations due to their massively parallel architecture, which has been heavily optimized for high-growth fields like machine learning. By leveraging GPUs, the path-cache IP approach can achieve substantial acceleration, enabling faster and more scalable k-cut congestion analysis while freeing CPU resources for other critical optimization tasks. This combination of path caching and GPU acceleration represents a promising direction for addressing the inefficiencies and scalability challenges of current network cut analysis methods.

Practical conventional network cut analysis is limited to 1 or maybe 2 cuts. Modeling multiple cuts in network cut analysis is challenging due to the exponential growth in scenarios, increased computational demands, and complex interdependencies between cuts. Each additional cut amplifies the number of failure scenarios, requiring resource-intensive recalculations of paths, link loads, and congestion states. These interactions often lead to cascading effects, making it difficult to predict traffic shifts and assess resilience accurately. In multilayer networks, these challenges are compounded by failure propagation across layers, adding nonlinear complexities. Traditional CPU-based methods struggle to handle this combinatorial explosion, necessitating advanced algorithms and parallel processing solutions, such as GPUs, to enable efficient and scalable multi-cut analysis.

The present disclosure significantly accelerates the throughput of the many scenarios generated during a network cut analysis (e.g., fiber cuts, shared risk link groups (SRLG) failures). The objective for each scenario is to analyze how links are loaded under given traffic demands, represented as a traffic matrix, and specific routing decisions, encoded in a routing matrix. By addressing this computational bottleneck with a GPU-accelerated process, we aim to enable more efficient and scalable evaluations. Before diving into the details of the central problem structure and its GPU-based resolution, we outline several simplifying assumptions and definitions to streamline the exposition.

Simplifying Assumptions (1) Single-Layer Propagation of Link Cut Scenarios: For simplicity and illustration purposes, we assume that link cut scenarios are propagated forward to a single network layer, such as Layer 3. While real-world multilayer networks require analysis of how failures propagate across layers, for this disclosure, we focus on the layer of interest at Layer 3 (L3) and cuts in an optical network at Layer 0 (L0). A CPU or a separate GPU dedicated to handling cut propagation is assumed to process the scenarios projected onto the selected layer. Later, we will discuss how multilayer failure propagation can also benefit from GPU acceleration.

(2) Single-Path Traffic Assumption: We assume traffic at the layer of interest is carried over a single path rather than split across multiple paths. This assumption is particularly useful for applications like network capacity sizing, where single-path routing often provides a more conservative estimate (e.g., requiring more capacity) than multi-path designs. For users interested in multi-path configurations, this single-path analysis can serve as a baseline for iterative optimization. After determining an initial set of viable capacities, further optimizations can introduce multi-path routing to refine capacity allocations and trim any excess. If, however, users already have predefined division ratios for splitting traffic among multiple paths (and mechanisms to adjust these ratios under cuts), the technique can be generalized to accommodate such scenarios. These extensions are described herein.

(3) Use of GPU as a Paradigmatic Architecture: Our approach relies on the highly parallel architecture of modern GPUs as the primary hardware platform. GPUs excel in handling the large-scale, parallel matrix-vector operations intrinsic to this problem. However, the methodology is not limited to GPUs alone; other hardware platforms with similar parallel properties (e.g., specialized accelerators, tensor processing units (TPUs), or non-GPU parallel processors) are also applicable. For clarity and specificity, we use GPUs as the exemplary realization throughout this disclosure.

By leveraging the computational power of GPUs, the analysis of traffic distribution under cut scenarios can be parallelized at an unprecedented scale. Each traffic matrix and routing matrix combination corresponding to a cut scenario can be processed simultaneously, drastically reducing computation times compared to traditional CPU-based approaches. This approach addresses not only the inefficiencies in sequential processing but also opens pathways for real-time or near-real-time analysis of complex networks with diverse failure scenarios.

The GPU-accelerated method described here serves as a foundation for more complex network analyses, including multilayer failure propagation and multi-path optimizations. By adopting this approach, network operators can achieve faster and more accurate capacity sizing, ensuring that networks are both resilient and efficiently optimized for real-world conditions.

Layer 3 (L3) Congestion Evaluation Under a Path Selection Stream

FIG. 1 illustrates a logical diagram illustration a system 10 for Layer 3 (L3) congestion evaluation under a path selection stream. FIG. 1 is described as a logical diagram that illustrates CPU and GPU operations in the system 10, including a GPU-CPU boundary 12 where there is interaction between GPU hardware and CPU hardware, on which the system 10 operates. The blocks in FIG. 1 represent locations where data is stored and processed. The system 10 includes a CPU side output analysis block 14, a CPU controller 16, and a CPU cut analysis block 18, all implemented in CPU hardware, connecting to the GPU hardware through the GPU-CPU boundary 12. The GPU hardware includes a streaming buffer block 20, a routing matrix and matrix multiplication block 22, and a GPU side result analysis stage block 24.

The network can be represented as a set of R routers (L3) whose size is $|R|$ connected by a set of links L of size $|L|$. The block 22 includes a traffic matrix 26 of router-router demands of size $O(|R|^2)$. In the system 10, we are interested in forming, across a potentially very large set of scenarios in which different paths are chosen (due to link cuts, router failures), the link loading for each scenario which is formed by matrix multiplication of the traffic matrix 26 with a routing matrix 28 of size $O(|R|^2)\times|L|$ to provide a link loading vector 30 of size $|L|$ with the load on each of the sets of links L in the network. On the link loading vector 30, we can take for example worst and average cases; as such it can be used directly to guide sizing on an un-capacitated network (e.g., multilayer optimization) or determine utilization on an existing capacity network (e.g., traffic engineering). The block 22 is loaded in the GPU hardware at low frequency and is fixed over life-cycle of an optimization/evaluation run, where the block 22 represents a network snapshot as a cache of multiple pairwise paths with particular cut completeness properties. The blocks 20, 24 are streamed into/out of the GPU hardware and evaluated at a rate that maximizes overall throughput, subject to available memory on the GPU hardware and a GPU/CPU bus transfer rate (at the GPU-CPU boundary 12).

In an L3 network, using the block 22, traffic can be represented using the routing matrix 28 and the traffic matrix 26 to model connectivity and demand across the network. The routing matrix 28 encodes the network's topology and path choices using path bit vectors for each router pair. Each row in this routing matrix 28 corresponds to a unique link in the network, while each column represents a router-to-router pair. A "1" in the routing matrix 28 indicates that a specific link is part of the selected path for the corresponding router pair, while a "0" indicates otherwise. This routing matrix 28 effectively captures the connectivity and routing structure of the network, showing how traffic flows across the available links.

The traffic matrix 26, on the other hand, represents the demand between each router pair in the network. To facilitate computation, the traffic matrix 26 is transformed into a traffic vector by replicating the demand for each router pair across the corresponding columns of the routing matrix 28. When the routing matrix 28 is multiplied by the traffic matrix 26, the resulting product provides the link load vector 30, which quantifies the total traffic on each link of the network. This representation in the block 22 enables efficient modeling and analysis of how traffic is distributed across the network, making it particularly useful for tasks such as congestion analysis and capacity planning. A calculation in the block 22 can yield the current link load vector 30 on all links with no cuts.

The proposed method leverages a combination of GPU and CPU resources to efficiently perform network cut analysis and calculate link loadings under various failure scenarios. The process begins by loading the GPU hardware with a fixed structure in the block 22 with the precomputed pair-wise routing matrix 28 and a replicated traffic matrix 26. The routing matrix 28 captures the thickened path structures for all router pairs, while the traffic matrix 26 represents the pair-wise traffic demands replicated for alignment with the routing matrix 28.

The CPU controller 16 manages the path selection process by performing a cut analysis to determine which paths in the cache need to be masked due to failed links. For each router pair, the CPU controller 16 identifies the shortest available path from the cache and encodes it as a bit mask, where the selected path is represented by a single "1" and all other entries are "0". This bit mask is then streamed into the GPU's streaming buffer block 20, via the CPU cut analysis block 18, for GPU hardware to receive updates as the CPU proceeds through the cut scenarios.

Using a path-selective traffic vector 32, the GPU hardware performs a direct multiplication with the replicated traffic matrix 26. This operation reshapes the traffic matrix 26 to isolate traffic loads specific to the selected paths, namely to adjust the traffic loads based on corresponding cuts masked in the path-selective traffic vector 32. The refined traffic matrix 26 is then multiplied by the routing matrix 28 in a core matrix multiplication operation. This multiplication ensures that only the selected paths "hit" the corresponding entries in the routing matrix, resulting in a precise computation of link loads under the current cut scenario.

The path-selective traffic vector 32 adjusts the traffic matrix 26 to account for the effects of one or more network cuts. It operates by isolating traffic along the active paths that remain viable after a cut and zeroing out traffic on paths impacted by the failure. For each router pair, a mask is created based on the cut scenario, identifying the shortest viable path from the precomputed path cache that avoids the cut links. This mask, represented as a bitmask with "1" for the active path and "0" for excluded paths, is used to create the path-selective traffic vector 22. This vector 22 is then multiplied element-wise with the replicated traffic matrix 26, which contains the traffic demands for all router pairs. This operation adjusts the traffic matrix 26 such that only the traffic corresponding to active paths remains, while traffic for disrupted paths is effectively removed. For scenarios involving multiple cuts, the process iteratively or simultaneously applies the masks, dynamically modifying the traffic matrix 26 to reflect the compounded effects of the cuts. The adjusted traffic matrix 26 is subsequently multiplied by the routing matrix, which encodes the network topology, to calculate the link loads. This final step determines how the adjusted traffic is distributed across the network's links, reflecting the routing and utilization changes resulting from the cuts. This approach ensures that network analysis accurately captures the redistribution of traffic, enabling precise assessments of congestion and resilience under varying failure conditions.

The traffic matrix 26 is modified to account for cut links by applying a path-selective traffic vector 28, which masks out unavailable paths based on the cuts. This path-selective vector 32 is multiplied element-wise with the traffic vector, zeroing out traffic on the affected paths while retaining traffic on viable paths. For scenarios with alternative paths, the remaining traffic is redistributed to these paths, provided they meet constraints like latency. The updated traffic vector is then combined with the routing matrix to calculate the redistributed link loads, reflecting the adjusted traffic flow and the network's response to the cuts.

Traffic redistribution after a network cut involves rerouting traffic from failed paths to operational ones, guided by failover mechanisms and routing protocols. The path-selective traffic vector 32 identifies active paths, masking out those impacted by the cut. The traffic initially assigned to the failed paths is then shifted to available alternatives, either entirely to the shortest remaining path in single-path routing or proportionally across multiple paths in multi-path scenarios. This redistribution respects constraints such as latency limits and bandwidth capacities. The updated traffic vector 26, reflecting the adjusted flows, is multiplied with the routing matrix 28 to compute new link loads, providing a clear picture of how traffic has been redistributed and the network's response to the cut.

The final output of this GPU-based calculation is the link loading vector 30, which represents the traffic load on each network link under the given routing and failure conditions. If additional GPU resources are available, further operations such as aggregation or optimization may be performed on the GPU itself. Otherwise, the link loading data is transferred back to the CPU side output analysis block 14 for subsequent analysis or integration into broader network optimization workflows. This hybrid CPU-GPU approach ensures efficient use of resources and accelerates the complex computations required for multi-scenario network cut analysis.

The proposed approach leverages several structural characteristics of the problem to optimize network cut analysis and link loading calculations. First, the natural sparsity inherent in the routing matrix 28 (as only a subset of links is used for any given path) allows for efficient computation, particularly on GPUs, which can exploit this sparsity to accelerate operations. Additionally, the master routing matrix 28 is highly rectangular at scale, with many more links (rows) than router pairs (columns). This structure is inherently well-suited for parallel computation, as GPUs excel at handling such large, rectangular matrices efficiently.

The problem is effectively framed around a single "master" routing matrix 28 and a replicated traffic matrix 26, both of which remain constant, while being acted upon by numerous selection vectors. Each selection vector corresponds to a unique cut scenario, identifying the active paths for the given conditions. This setup enables direct parallelization on the GPU, as the same master routing matrix 28 can be processed against multiple selection vectors simultaneously, significantly boosting throughput.

Finally, the workflow is designed to operate as a tunable data stream between the CPU and GPU. The CPU streams selection vectors derived from the cut analysis to the GPU, where parallelized computations process these against the routing matrix 28 and traffic matrix 26. The results—link loading vectors—are then streamed back to the CPU for further aggregation or downstream processing. This hybrid CPU-GPU model is optimized for throughput, with the parallelization structure dynamically tuned to maximize efficiency and handle large-scale network scenarios effectively.

Parallelism

With the core approach described above, this approach is highly effective for supporting multiple cuts because it leverages parallel computation to process numerous scenarios simultaneously. Each cut scenario is treated independently, allowing unique path selection and traffic adjustment operations to be executed in parallel without interdependencies slowing the process. The use of shared data structures, such as a fixed master routing matrix 28 and the replicated traffic matrix 26, further enhances efficiency by minimizing memory overhead and avoiding redundant computations for every scenario. The path-selective traffic vector 32, which adjusts traffic for specific cut scenarios, is simple to create and apply, making it ideal for distribution across GPU threads.

The GPU's strength in parallelizing core matrix operations is key to this approach. The multiplication of the adjusted traffic matrix 26 with the routing matrix 28 for each cut scenario can be performed concurrently, leveraging the GPU's capacity to handle thousands of parallel threads. This scalability ensures that even complex analyses involving numerous simultaneous cuts can be completed quickly. Additionally, the dynamic streaming of data between the CPU and GPU optimizes the division of labor: the CPU handles scenario generation and path selection logic, while the GPU focuses on intensive computations like traffic adjustment and matrix multiplications. By aligning the parallel structure of the problem with the computational strengths of GPUs, this approach enables efficient and scalable analysis of multi-cut scenarios in large and complex networks.

The following describes three example parallelization approach that, individually and in tuned combination, are particularly valuable and leading to speed-ups on the order 10 to order 100 compared to single threaded CPU, namely Sparse-Matrix Vector multiplication, Asymmetric Rectangular scaling, and Cut Scenario Parallelism. Sparse matrix-vector multiplication (SpMV) offers a significant boost in parallelism for this approach, leveraging the inherent sparsity in both the routing matrix 28 and the traffic matrix 26. As networks scale beyond the smallest sizes, the typical shortest or constrained shortest paths utilize only a small subset of the available network edges, creating a sparse structure in the routing matrix 28. This sparsity reduces the number of non-zero entries, making it computationally more efficient to process. When the traffic matrix 26 is multiplied by the path selection vector 32, the resulting adjusted traffic matrix 26 also becomes sparse, as only a single path per router pair remains active while others are effectively zeroed out.

Known GPU-accelerated algorithms for SpMV can be applied to take advantage of this sparsity. GPUs are particularly well-suited for this task, as SpMV algorithms are optimized to handle the irregular memory access patterns and reduced computational load associated with sparse data structures. These algorithms distribute the computations for non-zero entries across GPU threads, enabling high levels of parallelism and significantly reducing the time required for matrix-vector operations compared to dense matrix approaches. An additional advantage of this sparsity is that it allows more data to fit into GPU memory. Sparse representations of the routing matrix 28 and the traffic matrix 26 occupy significantly less memory compared to dense structures, enabling larger and more complex networks to be analyzed without memory bottlenecks. This scalability ensures that even as the network size and number of cut scenarios increase, the GPU can efficiently handle the workload. By combining sparsity-aware computations with GPU acceleration, this approach achieves a highly efficient and scalable framework for multi-cut network analysis.

SpMV is particularly effective in balancing memory efficiency and computational speed, as it focuses only on non-zero elements in the matrix and vector, reducing unnecessary operations and memory usage. This makes SpMV especially advantageous for large-scale networks where sparsity is inherent and memory constraints are significant. However, in cases where memory is not a restriction, such as in small to medium-scale networks, dense matrix-dense vector multiplication also becomes a viable and often superior option. In these scenarios, where the routing matrix and traffic vector are fully populated (dense), GPUs demonstrate exceptional performance due to their highly optimized architecture for dense operations. GPUs excel at processing dense data by leveraging their high throughput for sequential memory access and optimized parallel computation, making dense matrix-dense vector multiplication both fast and efficient for smaller networks. This flexibility ensures that the computational framework can adapt to the characteristics of the network being analyzed, maximizing performance for both sparse and dense data structures depending on the network's size and complexity.

Figure 2:
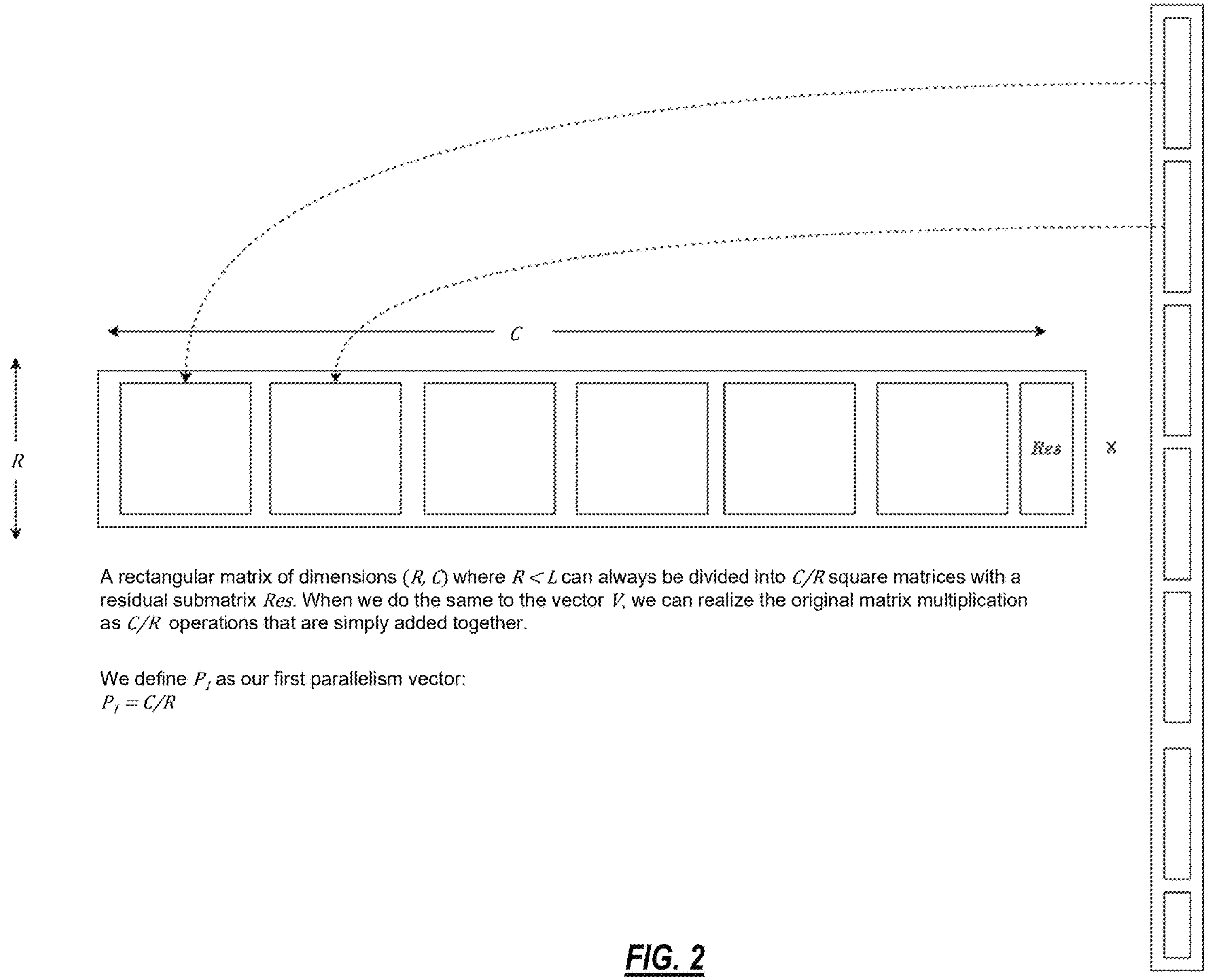
FIGS. 2 and 3 illustrate logical diagrams of rectangular to square parallelization of matrices.
Figure 3:
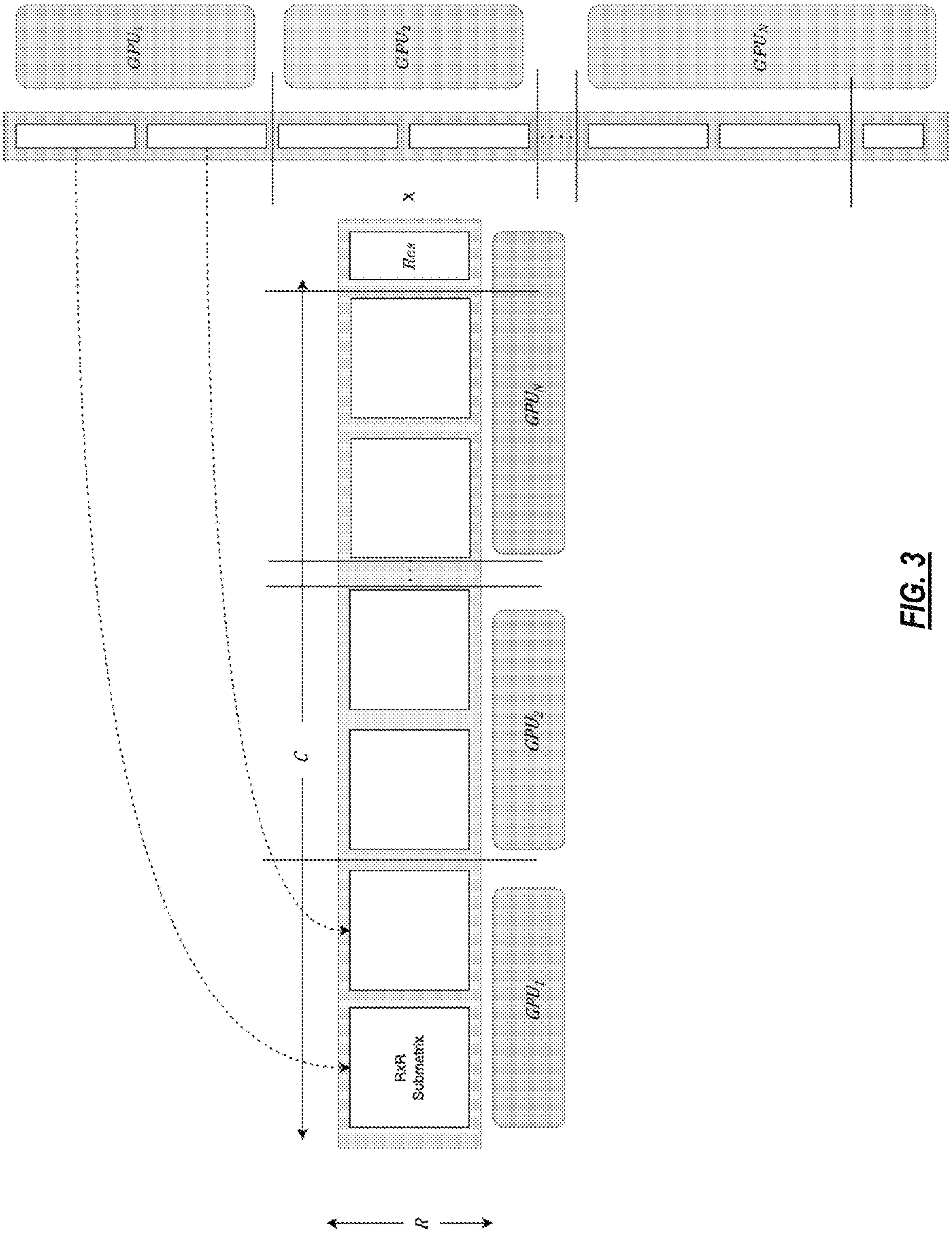

For Asymmetric Rectangular scaling: Inherent in the scaling of paths and link counts in practical networks, there is an inherent and empirically universal asymmetry factor. This asymmetry factor can be understood based on FIGS. 2 and 3 which are logical diagrams illustrating rectangular to square parallelization of matrices. A rectangular matrix of dimensions (R, C) where R<L can always be divided into C/R square matrices with a residual submatrix Res. When we do the same to the vector V, we can realize the original matrix multiplication as C/R operations that are simply added together. We define $P_1$ as our first parallelism vector: $P_1$=C/R. Of note, as illustrated in FIG. 3, this can be split across multiple GPUs, with each GPU using mature square-matrix optimized algorithms to parallelize.

The ability to handle multiple cut scenarios in parallel is a critical advantage of this GPU-accelerated approach. This parallelism arises from the GPU's ability to process multiple simultaneous path selection operations while leveraging the available memory resources. After storing the fixed structures—such as the routing matrix 28 and the replicated traffic matrix 26—the remaining GPU memory can be used to hold multiple path selection vectors 32, each corresponding to a unique cut scenario. These path selection vectors define the active paths for each scenario, enabling the GPU to perform parallel computations across multiple cut cases.

In combination with the parallelism strategies inherent in SpMV and traffic vector sparsity, this design allows for a high degree of concurrency. Each cut scenario requires a separate multiplication of its path-selective traffic vector with the routing matrix. GPUs, with their massively parallel architecture, can execute these multiplications concurrently, enabling a multiplicity of operations against the shared routing matrix and replicated traffic vector. This parallel execution ensures that the workload scales efficiently with the number of cut scenarios. Instead of processing cut cases sequentially, the GPU can simultaneously compute link loads for many scenarios, drastically reducing the overall time required for multi-cut analysis. The combination of cut scenario parallelism and the sparsity-aware optimizations enhances throughput, allowing large-scale networks with numerous potential failure scenarios to be analyzed quickly and effectively.

By dynamically balancing memory usage and computational resources, this approach maximizes the GPU's potential, making it possible to handle a wide range of cut scenarios without sacrificing speed or scalability. This parallelism not only accelerates the analysis process but also provides flexibility in handling diverse and complex failure conditions, which is critical for robust network design and planning.

Extensions

Bit-packing is an effective strategy for optimizing GPU memory usage in this approach, particularly when working with the routing matrix, where entries are binary values (1 or 0). Since these binary entries indicate whether a specific link belongs to a given path, they can be efficiently stored in a bit-packed representation. Instead of allocating a full byte or larger memory unit for each binary entry, multiple entries can be packed into a single byte or word, dramatically reducing memory requirements. For instance, a single byte (8 bits) can encode the presence or absence of links for up to 8 alternative paths, effectively condensing what would otherwise require 8 separate memory units into one.

The framework balances flexibility and performance by supporting standard 16-bit and 32-bit formats commonly used on GPUs while also accommodating reduced-precision formats like 8-bit integers for improved memory efficiency and speed on compatible hardware. These reduced-precision formats provide a middle ground between standard representations and full bit-packing strategies, offering memory savings without sacrificing compatibility. The present disclosure contemplates both standard and low-precision options alongside bit-packing.

This bit-packed representation not only minimizes the memory footprint of the routing matrix 28 but also scales well with network size and the depth of the path cache. As networks grow larger or require more extensive path caching to handle a wide range of failure scenarios, the bit-packing strategy ensures that memory usage remains proportional and manageable. This is particularly critical for GPU-based implementations, where memory is a valuable and limited resource. By reducing the memory required to store the routing matrix, bit-packing allows more scenarios or deeper path caches to fit into the available GPU memory, increasing the scope and scale of analysis that can be handled concurrently.

Additionally, modern GPUs are well-equipped to handle bit-packed data with specialized operations and instructions. For example, GPUs can perform bitwise operations such as AND, OR, and SHIFT directly on bit-packed data, enabling fast and efficient computation without the need to unpack the bits into a more traditional format. This capability ensures that bit-packing not only saves memory but also maintains or even enhances computational efficiency. Bit-packing leverages the binary nature of the routing matrix 28 entries to significantly reduce memory usage while retaining high computational efficiency. By encoding multiple path alternatives within a single memory unit, this strategy enables the GPU to handle larger and more complex networks, deeper path caches, and numerous cut scenarios simultaneously, making it a cornerstone of the optimization process.

For extra-large networks, even after employing memory optimization strategies like bit-packing and other efficiency techniques, the fixed matrix structure (e.g., the routing matrix 28 and replicated traffic matrix 26) may exceed the GPU's memory capacity. In such cases, it is still possible to process the network effectively by using a streaming sub-matrix approach, leveraging the GPU's ability to handle smaller, square sub-matrices sequentially. This approach involves breaking the larger routing matrix 28 into manageable sub-matrices, each of which is streamed into the GPU for processing while the CPU manages the flow of data between the two.

This strategy extends the parallelization of square matrices, where each sub-matrix is treated as a standalone unit for computation, allowing the GPU to perform SpMV and other operations efficiently within its memory limits. Although the CPU-GPU data streaming introduces some overhead compared to processing the entire matrix in a single batch, the relative performance gain remains significant. This is especially true for large networks that are inherently problematic to analyze using conventional CPU-only methods, which lack the computational power and parallelism offered by GPUs. The GPU processes each sub-matrix in parallel across its cores, ensuring that even with streaming, the computation within each segment remains highly optimized. Additionally, overlapping data transfers with computation can mitigate some of the latency associated with CPU-GPU streaming. For example, while the GPU processes one sub-matrix, the CPU can prepare the next sub-matrix for transfer, enabling a pipeline-like workflow that minimizes idle time.

By combining the sparse representation of dependency graphs with GPU acceleration and a streamed pairing strategy, this approach enables efficient and scalable fault analysis across multilayer networks. It not only handles the complexity of fault propagation but also ensures that large-scale and diverse failure scenarios can be analyzed in real time, providing valuable insights for network resilience and optimization.

The basic scheme for network cut analysis focuses on the most common and critical scenarios, such as single cuts ($k=1$) or dual cuts ($k=2$), which are computationally manageable and represent a significant portion of practical failure cases. However, when deeper cut levels ($k \geq 3$) are required, the strategy is extended to handle the increased complexity efficiently. The following steps outline this deep cut/path streaming extension:

(1) Fast Rule-Based Filtering: Before proceeding with detailed analysis, simple and fast rules are applied to eliminate unnecessary computations. For instance, a $k=3$ cut scenario that includes a $k=2$ case already ruled out as non-impactful can itself be ruled out without further analysis. This filtering step significantly reduces the number of scenarios requiring deeper analysis.

(2) Early Disconnect Detection: Known fast techniques are used to determine if the network suffers a full disconnect under a deeper cut scenario. In cases of full disconnection, congestion analysis is often unnecessary since the network's ability to carry traffic is entirely compromised. This step prevents unnecessary resource usage on unviable scenarios.

(3) Path Exhaustiveness Awareness: The system keeps track of whether the precomputed k-shortest paths were exhaustive or if there are additional longer paths that might need consideration. For scenarios where the current path cache does not fully cover potential alternatives, this awareness guides decisions on extending the analysis.

(4) Latency-Constrained Path Viability: Available paths are evaluated to ensure they remain relevant, considering constraints such as latency. Even if longer paths exist, they may be excluded from consideration if they violate acceptable latency limits for the network.

(5) Selective PCE Revisit: For specific deep cut scenarios that meet the gating criteria outlined above, it may be necessary to revisit the PCE to compute extended paths. This step ensures that scenarios requiring additional detail are handled comprehensively without overloading the analysis pipeline.

(6) Streaming Path Updates to the GPU: Requests to the PCE for extended paths are streamed back into the analysis process, updating the routing matrix 28 as necessary. The updated matrix is then transferred to the GPU for further processing. To maintain efficiency, the size of these updates is managed dynamically, taking into account the throughput and latency of the CPU-GPU interface. This ensures that the GPU continues to process scenarios without being bottlenecked by the data transfer process.

By combining these strategies, the approach ensures that deeper cuts are handled in a resource-efficient manner, focusing computational effort only on scenarios with significant impact. The use of gating criteria, early disconnection checks, and dynamic streaming of extended paths allows for scalable and flexible handling of complex failure cases, maintaining the throughput and responsiveness of the overall system.

Thus far, the discussion has focused on scenarios where traffic is carried exclusively along single-shortest paths. This case remains highly relevant for network capacity sizing, as single-path routing often provides a more conservative estimate of required resources, even in networks that intend to use multi-path protocols. Single-path analysis is particularly valuable as a baseline, helping to establish initial capacity needs before refining designs with multi-path optimizations. However, the methodology can be generalized to accommodate multi-path scenarios where traffic is divided among multiple paths.

In the generalized case, the cut analysis specifies not a single path but a weighted division of traffic among multiple paths. Each path is assigned a floating-point weight, representing the proportion of traffic routed along that path under a given cut scenario. For instance, if two paths are available between a pair of routers, traffic might be split such that 60% uses the primary path and 40% uses the secondary path. These weights replace the binary (0/1) indicators used in the single-path case, transforming the path selection factors into floating-point weight vectors that sum to 1 for each scenario.

The introduction of weighted traffic division does not significantly alter the overall analysis pipeline. The parallel accelerations and GPU-based processing strategies described earlier remain applicable with minimal modification. The routing matrix 28 and replicated traffic matrix 26 are still central to the calculations, but now, instead of a binary multiplication to filter traffic for a single path, the GPU performs element-wise multiplications of the traffic matrix 26 with the weighted path-selection factors. This operation ensures that traffic is distributed across all viable paths according to the specified weights for each router pair and cut scenario.

Additionally, the computation of link loads—performed by multiplying the routing matrix with the weighted traffic vector—remains efficient and parallelizable on the GPU. Sparse representations of the routing matrix and traffic vectors, as well as the GPU's ability to handle floating-point operations, ensure that the added complexity of weighted path distributions does not compromise computational performance.

This generalization makes the approach highly versatile, supporting networks that use multi-path routing protocols such as equal-cost multi-path (ECMP) or Segment Routing. It enables precise modeling of traffic distribution under realistic conditions, accounting for protocol-level traffic splitting and the dynamic impact of network cuts. By retaining the same foundational parallel processing strategies, the methodology ensures scalability and efficiency even in more complex, multi-path network scenarios.

SUMMARY

The modeling of the link loading problem, central to congestion analysis and network sizing in the face of cuts, can be effectively represented as a specific type of matrix-vector-vector multiplication. This formulation captures the relationship between the network's topology (represented as a matrix), the traffic demands (as a vector (matrix)), and the path selections or traffic distributions (another vector). This structure is not only computationally efficient but also highly amenable to parallel processing on modern high-thread-count architectures such as GPUs, enabling scalable solutions for complex networks.

The matrix-vector-vector structure benefits from three distinct parallelization strategies, each of which exploits specific aspects of the problem to enhance efficiency. First, sparse matrix-times-sparse-vector multiplication leverages the inherent sparsity of the routing matrix and adjusted traffic vector. By focusing computational resources only on non-zero entries, this strategy significantly reduces the computational burden and maximizes GPU memory efficiency. Second, the problem involves the parallelization of highly rectangular matrix-vector multiplication, where the routing matrix typically has many more rows (representing links) than columns (representing router pairs). GPUs excel at processing such matrices, distributing workloads across threads to achieve rapid computation. Third, parallelization of path selection as an overarching optimization enables multiple cut scenarios or path combinations to be processed simultaneously. This strategy aligns well with the GPU's capability to handle independent tasks in parallel, further accelerating throughput.

To ensure maximum efficiency, the system is designed to tune parallelization factors dynamically, optimizing the balance between computational throughput and memory usage. Memory efficiency is further enhanced through bit-packing of the routing matrix, compressing its binary entries into a minimal representation. This allows large networks and extensive failure scenarios to fit within GPU memory, while also enabling efficient processing via bitwise operations.

For scenarios involving networks too large to fit even after bit-packing, a streaming strategy is employed. The large rectangular routing matrix is decomposed into square sub-matrices, which are streamed into the GPU in manageable chunks. This ensures that even extra-large networks can be analyzed without requiring excessive hardware resources. Additionally, contingencies for deep cut analysis enable efficient processing of higher-order cut scenarios by applying gating rules to eliminate unnecessary calculations, revisiting the PCE only when needed, and dynamically updating the routing matrix.

Finally, the system accommodates scenarios with explicit routing of flows over multiple paths. By generalizing the path-selection process to include weighted traffic distributions across paths, the methodology can handle advanced routing protocols such as ECMP or segment routing. This generalization maintains the same parallelization benefits, ensuring scalable performance even for multi-path scenarios.

This comprehensive framework integrates efficient modeling, advanced parallelization techniques, and flexible memory management to address the most demanding challenges in network cut analysis and link load computations. It is designed to scale with network size and complexity, providing robust support for congestion analysis and capacity planning across a wide range of real-world scenarios.

Multilayer Combined Block GPU Optimization

In multilayer networks, fault propagation can be effectively modeled using dependency graphs, where nodes represent network elements (e.g., routers, links, or optical components) and edges capture the dependency relationships between them. For instance, a failure in the optical layer (L0) might cascade into the IP layer (L3), impacting multiple links or paths. These dependency graphs can be represented as sparse arrays, capturing only the significant interactions rather than the entire network topology, which reduces memory usage and computational overhead.

The sparse propagation array, derived from the dependency graph, can be mapped directly to GPU memory. Once loaded into the GPU's fixed memory, this sparse representation serves as a foundation for analyzing fault propagation efficiently. By leveraging the sparsity of the graph, GPU memory usage is minimized, allowing the system to store a representation that scales with the complexity of fault dependencies rather than the size of the entire network. This approach ensures that even large and multilayer dependency graphs can fit within the GPU's memory.

With the sparse propagation array in place, a multitude of k-cut scenarios can be analyzed simultaneously. Each k-cut scenario corresponds to a specific combination of failures, which can be processed independently. The GPU's massively parallel architecture enables it to handle these scenarios concurrently, applying the sparse propagation array to determine how faults cascade through the network layers and impact connectivity and traffic.

The streamed pairing mechanism further optimizes this process. The CPU can generate cut scenarios dynamically, pairing them with the fixed sparse propagation array on the GPU. As the GPU processes one batch of cut scenarios, the CPU prepares the next batch, creating a pipeline that maximizes computational efficiency. This streaming mechanism allows the system to handle a continuous flow of scenarios without idle GPU resources, ensuring high throughput and scalability.

In general, fault propagation throughout a multilayer network can be represented using the dependency graphs, which provide a structured way to visualize and analyze how failures in one component can affect other interconnected elements. By modeling the network as a set of nodes and edges, where each edge indicates a dependency between layers or subsystems, it becomes possible to track how faults at a lower layer percolate upwards and potentially compromise system functionality at higher layers. Such dependency graphs often utilize sparse array-based representations to efficiently capture these relationships, and this data structure can be mapped onto GPUs to leverage parallel processing. Once stored in fixed GPU memory, a large number of different scenarios, including multiple k-cut analyses (scenarios where a small set of critical connections are removed or fail), can be examined concurrently. This parallelization not only accelerates the computation but also enables a more comprehensive exploration of how faults propagate through the network. Ultimately, by leveraging dependency graphs and GPU-based analysis, engineers can more rapidly identify weak points, assess the resilience of their systems, and devise strategies to mitigate fault propagation across complex, multilayered architectures.

By modeling the network's layers and their interconnections as a dependency graph, when you introduce a "cut" at a lower layer—essentially removing or disabling one or more of these connections—the graph structure allows you to trace how that disruption travels through the dependency chain. In other words, if a component in Layer 1 fails, you can follow all edges originating from that component (or from those it directly supports) to see which higher-layer components will lose a critical input or resource. By mapping this dependency graph into a sparse array-based structure, and then porting that structure to the GPU, you gain the ability to efficiently simulate large numbers of fault scenarios in parallel. For each cut scenario, the GPU-accelerated analysis can propagate the changes through the graph to show which nodes at upper layers would be impacted. The speed and scalability of GPU processing means you can evaluate not just one fault scenario, but dozens or even hundreds of them concurrently, quickly building a comprehensive understanding of how lower-layer disruptions ripple upward. As a result, you can pinpoint specific vulnerabilities, quantify their effects on upper-layer functionality, and develop mitigation strategies to enhance the resilience of the entire system.

Figure 4:
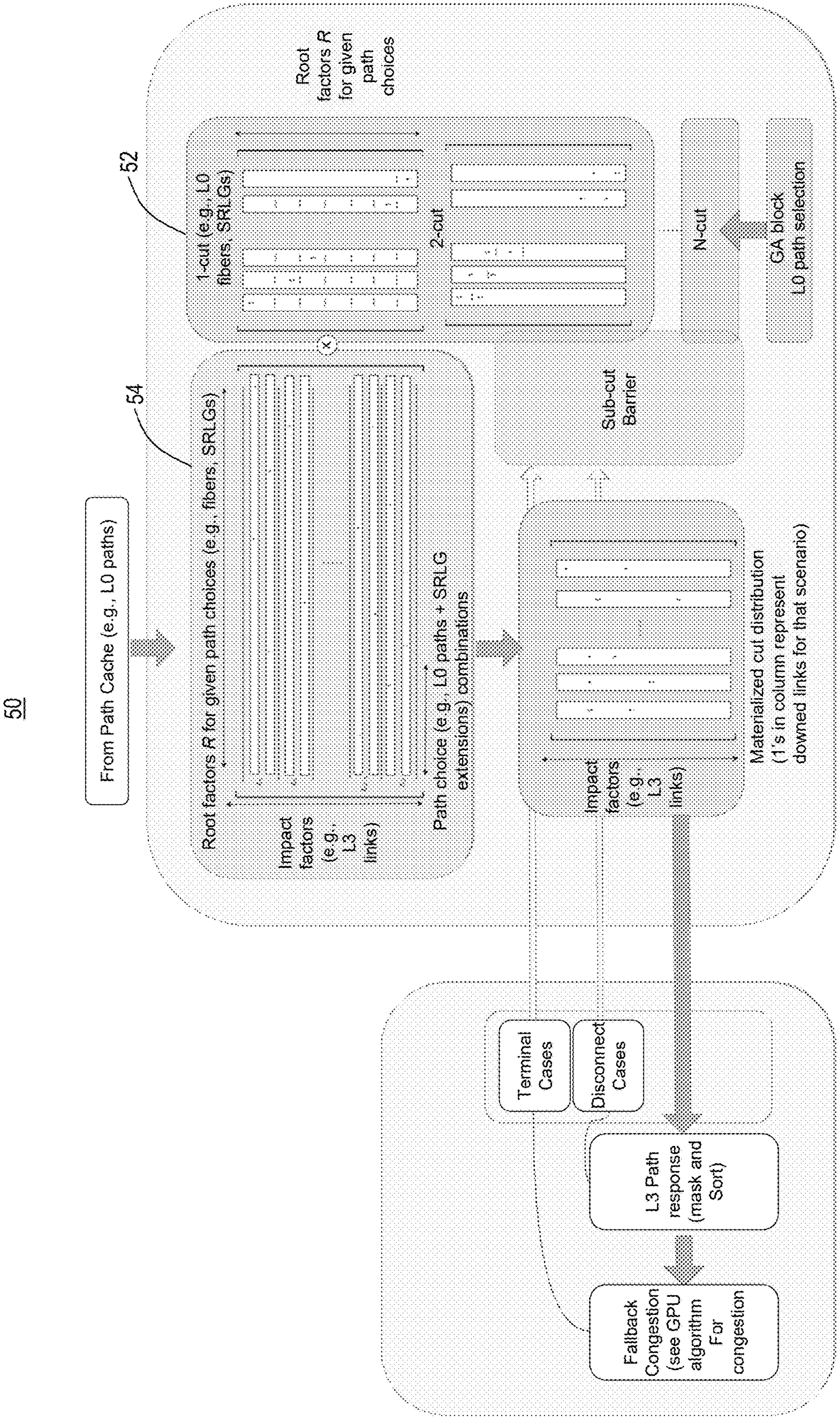
FIG. 4 illustrates a logical diagram of a system for multilayer combined block GPU optimization.

FIG. 4 illustrates a logical diagram of a system 50 for multilayer combined block GPU optimization. The proposed framework leverages advanced optimization algorithms, such as genetic algorithms (GA), to select specific Layer 0 (L0) paths from a variety of potential options to support network links. These optimization algorithms explore diverse path combinations, evolving through generations to identify optimal configurations. Each generation of the GA produces a set of candidate path selections, which are evaluated under scenarios involving 1, 2, or higher-order cuts, subject to the limits of GPU memory. The memory efficiency is enhanced through sparse and bitwise compression techniques, ensuring that even complex scenarios fit within the GPU's capabilities.

To calculate the impacts of these path selections efficiently, the framework represents cut scenarios using a banded-sparse cut matrix 52 and a medium-sparse path matrix 54. These matrices have a highly regular and ordered structure, making them ideal for fast parallel processing on GPUs. The GPU processes these matrices in parallel, enabling rapid evaluation of the effects of various cuts on the network paths. This approach not only accelerates the analysis but also ensures scalability for large and complex networks.

The outputs of this process are materialized in a form that can be aggregated to derive probability distributions, correlation matrices, and other statistical measures of link failure impacts. These aggregated results provide valuable insights into the likelihood and interdependencies of failures, aiding in network planning and resilience assessment. Alternatively, the framework allows the link failure cut distributions to be streamed as a population of link failure scenarios to subsequent blocks for further analysis. For example, these distributions can be passed to an L3 cut response block on either the CPU or GPU, which processes the scenarios to assess their impact on Layer 3 routing. The results can then feed into a congestion analysis block, which evaluates the potential for traffic bottlenecks under the simulated failure conditions.

An additional layer of efficiency is provided by the sub-cut barrier, which filters higher-order cuts by eliminating scenarios that contain inadmissible lower-order cuts. For example, a 3-cut scenario that includes a 1- or 2-cut scenario already deemed infeasible is automatically excluded from further analysis. This filtering mechanism reduces computational overhead and ensures that resources are focused on relevant scenarios.

System

Figure 5:
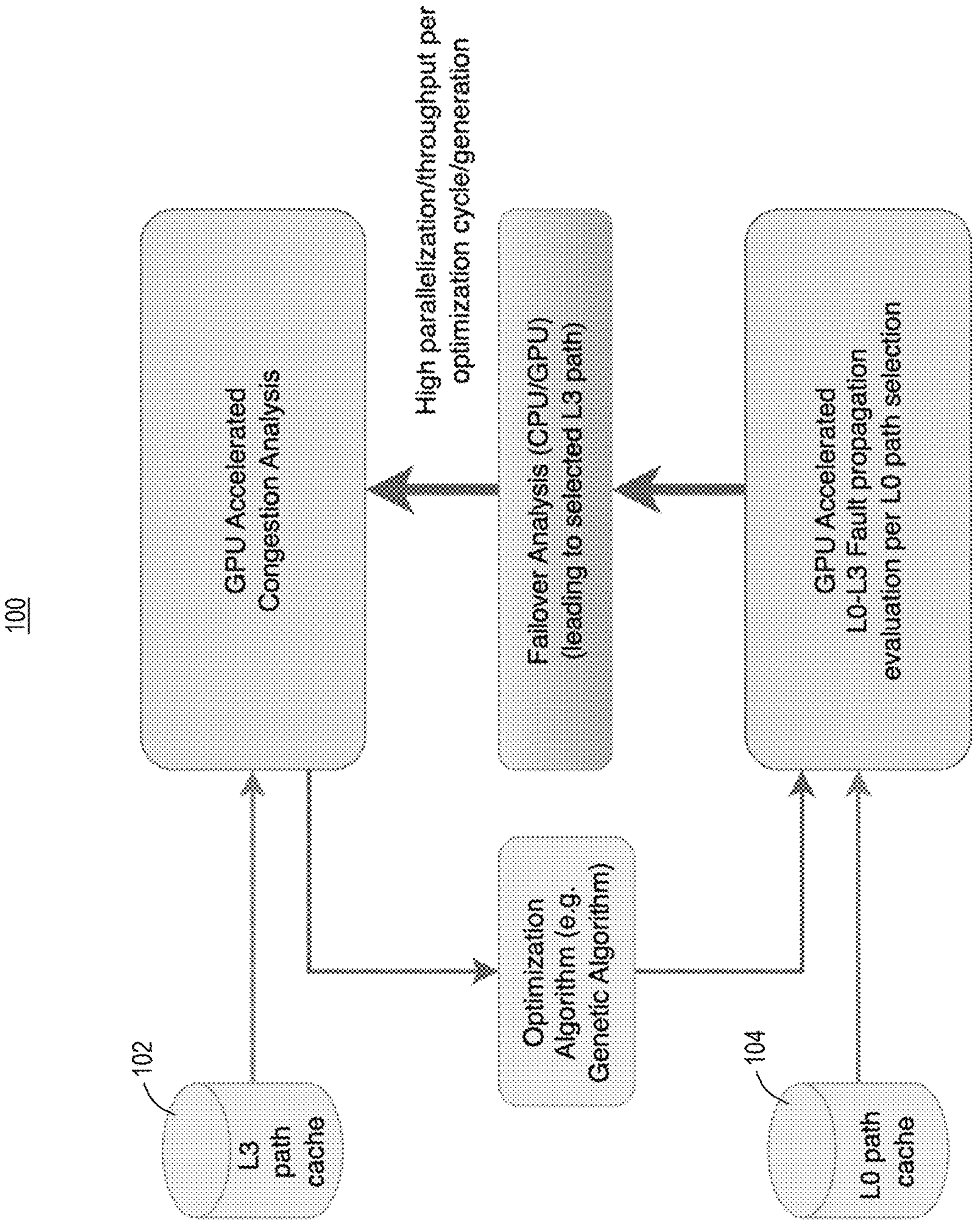
FIG. 5 illustrates a flow diagram of a GPU accelerated congestion analysis system.

FIG. 5 illustrates a flow diagram of a GPU accelerated congestion analysis system 100. The fundamental computational challenge of resilient multilayer network optimization lies in identifying optimal Layer 0 (L0) and Layer 3 (L3) paths that remain efficient and robust under controlled amounts of network cuts. The present approach addresses this challenge by leveraging precomputed path caches 102,

104, which provide a set of alternative path choices for both L0 and L3 layers. These caches 102, 104 form the basis for analyzing a large number of cut scenarios simultaneously.

Using structured and unstructured sparse matrix techniques, the framework enables a large multiplicity of cut scenarios to be processed in parallel on GPUs. This parallelization dramatically accelerates the evaluation of potential failures, ensuring that even complex networks with numerous cut combinations can be analyzed efficiently. The outputs of this step—link cut scenarios—are used to drive a failover analysis, determining how L3 routing adapts under each cut. Specifically, this analysis identifies which new L3 shortest paths are used to reroute traffic when links or nodes fail.

The failover analysis, in turn, feeds directly into a GPU-accelerated congestion analysis, a core component of this framework. This step evaluates the traffic loads on the network under failover conditions, identifying potential congestion points and enabling informed capacity planning. For simple failover scenarios, the process can be modeled as masking out knocked-out paths, revealing the shortest remaining path in the routing slice. This operation can be efficiently implemented using array masking techniques, which are well-suited for GPU processing due to their high degree of parallelism.

For more complex failover scenarios, such as those involving advanced protocols or multi-path routing adjustments, the failover analysis may initially be performed on the CPU. This allows for the inclusion of more intricate logic and decision-making. Once appropriate GPU-based algorithms are developed for these cases, the failover analysis can also be transitioned to the GPU to further improve performance. By integrating path caching, GPU-accelerated parallel processing, and efficient failover modeling, this framework provides a scalable solution for resilient multi-layer network optimization. It ensures that both L0 and L3 path selections are not only optimal under ideal conditions but also robust under a controlled range of cut scenarios, enabling networks to maintain performance and reliability in the face of failures.

Process

Figure 6:
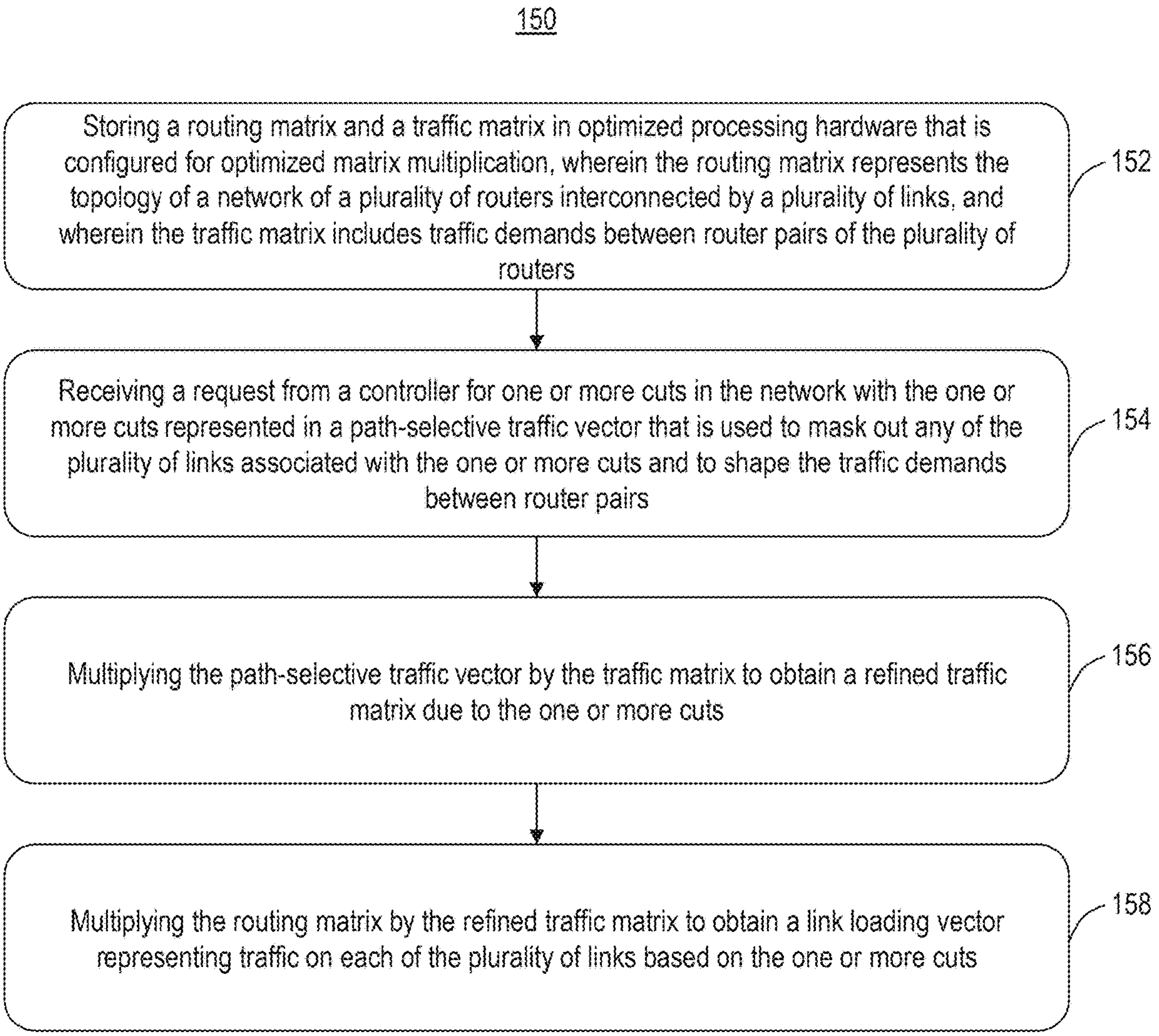
FIG. 6 illustrates a flowchart of a process for a network cut analysis using graphics processing unit (GPU) acceleration.

FIG. 6 illustrates a flowchart of a process 150 for a network cut analysis using graphics processing unit (GPU) acceleration. The process 150 contemplates implementation as a computer-implemented method with steps, via circuitry such as CPU and GPU hardware configured to implement the steps, and as a non-transitory computer-readable medium storing instructions that, when executed, cause processing hardware to implement the steps.

The process 150 includes storing a routing matrix and a traffic matrix in processing hardware that is configured for optimized matrix multiplication, wherein the routing matrix represents the topology of a network of a plurality of routers interconnected by a plurality of links, and wherein the traffic matrix includes traffic demands between router pairs of the plurality of routers (step 152); receiving a request from a controller for one or more cuts in the network with the one or more cuts represented in a path-selective traffic vector that is used to mask out any of the plurality of links associated with the one or more cuts and to shape the traffic demands between router pairs (step 154); multiplying the path-selective traffic vector by the traffic matrix to obtain a refined traffic matrix due to the one or more cuts (step 156); and multiplying the routing matrix by the refined traffic matrix to obtain a link loading vector representing traffic on each of the plurality of links based on the one or more cuts (step 158).

The process 150 can further include providing the link loading vector to the controller. In an embodiment, the processing hardware includes one or more graphics processing units (GPUs) and the controller is implemented in one or more central processing units (CPUs). The routing matrix includes rows corresponding to links, columns to router pairs, and binary entries indicating whether a specific link is part of a given router pair's path, and wherein the traffic matrix encodes the traffic demand between router pairs, replicated to align with the routing matrix columns. In an embodiment, the traffic demands are Layer 3 (L3) Internet Protocol (IP) traffic between the routers, and wherein the plurality of links are optical connections at Layer 0 (L0).

The multiplying can utilize sparse-matrix vector multiplication (SpMV) with parallelizes computations by leveraging sparsity, focusing processing power only on non-zero elements, based on a size of the network. The storing can include dividing the routing matrix and the traffic matrix into a plurality of square matrices and a residual matrix, based on a size of the network. That is, the multiplying and storing can be optimized using these techniques for larger network sizes, and these techniques may be avoided for small to medium sized networks. As described herein and as is generally known in the art, the network size can be determined by the number of routers, and larger network sizes tend to be on the order of 100 or more routers whereas small to medium sized networks can be less than 100 routers. Of course, the number of links also factors into the network size as smaller number of routers with more links may also be considered a larger network size.

Processing System

Figure 7:
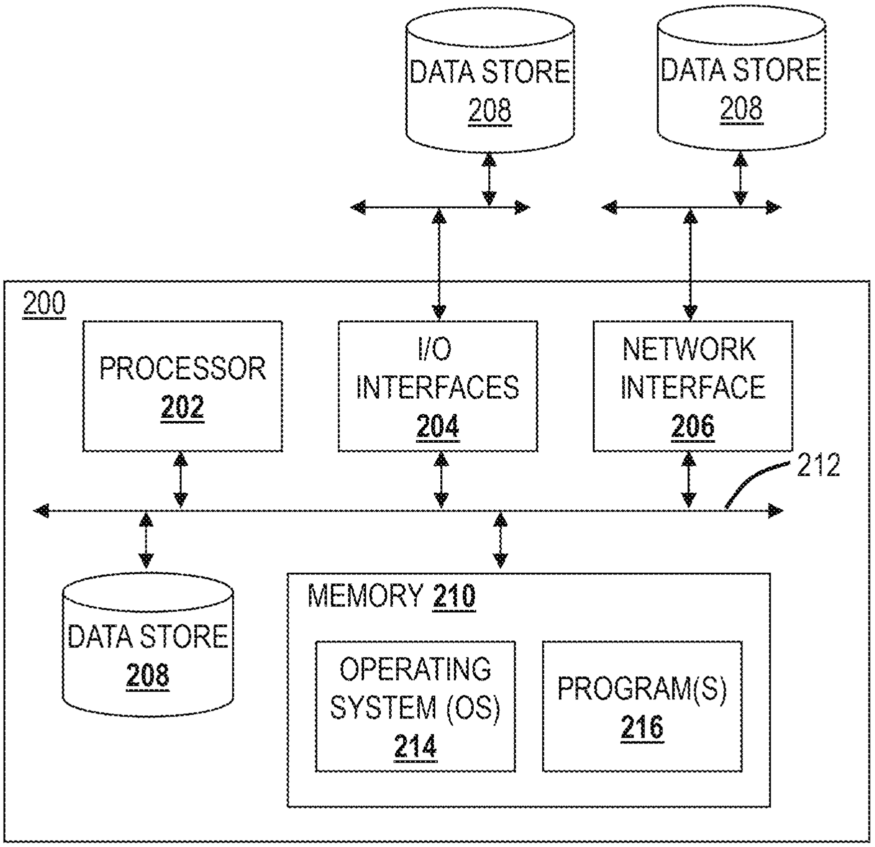
FIG. 7 illustrates a block diagram of a processing system, which can be used to implement the process of FIG. 6.

FIG. 7 illustrates a block diagram of a processing system 200, which can be used to implement the process 150. The processing system 200 is a digital computer that typically includes a plurality of processors 202, input/output (I/O) interfaces 204, a network interface 206, a data store 208, and memory 210. Note that FIG. 7 presents a simplified version of the processing system, and practical embodiments may include additional components and logic to support known operational features not described here. The components (202, 204, 206, 208, and 210) are connected via a local interface 212, which could be a bus or other wired or wireless connections, as known in the field. The local interface 212 may also include other elements like controllers, buffers, drivers, and receivers to support communication among components. It may also handle address, control, and data connections for proper communication.

The processors 202 are hardware devices designed to execute software instructions. It may be any type of processor, including a custom-made or commercially available CPU, GPU, TPU, an auxiliary processor, a semiconductor microprocessor (such as a microchip or chipset), or other devices capable of running software. When the processing system 200 is active, the processor 202 executes software stored in the memory 210, manages data communication with the memory, and controls the overall operations of the system based on the software.

The processors 202 include processing hardware configured for matrix multiplication. As described herein, the matrix multiplication with the processing hardware is faster, more efficient, uses less power, etc. than matrix multiplication on general-purpose processors, such as CPUs. Matrices include the routing matrix 28, the traffic matrix 26, the path-selective traffic vector 32, etc., i.e., a vector is also a matrix, with a single row or column. The processing hardware can include, e.g., GPUs, TPUs, GPUs with embedded TPUs, and the like. The processing hardware can also include customized circuitry for performing such operations (i.e., matrix multiplication), such as realized as field programmable gate arrays (FPGAs), application-specific integrated circuits (ASICs), programmable logic devices (PLD), or the like. As well, in some embodiments, the processing hardware can be CPUs such as in a high-core count configuration with software optimized for performing the optimized matrix multiplication. A key aspect is the processing hardware is separate from the CPU hardware performing the functionality in the blocks 14, 16, 18, and the processing hardware is quickly and efficiently providing the link loading vector 30 thereto.

The I/O interfaces 204 handle input from and output to external devices or components. The network interface 206 enables the processing system 200 to communicate over a network, supporting address, control, and data connections. The data store 208 stores data and may include volatile memory (e.g., random access memory (RAM) such as DRAM, SRAM, SDRAM) and nonvolatile memory (e.g., ROM, hard drives, tape, CDROM), as well as combinations of these. It may use electronic, magnetic, optical, or other storage media. The data store 208 can be internal to the system (e.g., an internal hard drive connected to the local interface 212) or external (e.g., an external hard drive connected via the I/O interfaces 204). It could also be part of a network, such as a network-attached file server.

The memory 210 can include both volatile and nonvolatile memory elements (e.g., RAM, ROM, hard drive, tape, CDROM) and may be electronic, magnetic, optical, or another type of storage media. The memory 210 may be distributed, with components located remotely but accessible by the processor 202. It stores software, which includes an Operating System (O/S) 214 and one or more programs 216. The O/S 214 manages the execution of programs 216 like the one(s), providing scheduling, input/output control, file management, memory management, and communication control. The program(s) 216 are designed to implement the processes, algorithms, methods, and techniques described in this disclosure.

Processing Circuitry and Non-Transitory Computer-Readable Mediums

Those skilled in the art will recognize that the various embodiments may include processing circuitry of various types. The processing circuitry might include, but are not limited to, general-purpose microprocessors; CPUs; Digital Signal Processors (DSPs); specialized processors such as Network Processors (NPs) or Network Processing Units (NPUs); GPUs; TPUs; FPGAs; PLDs, or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more ASICs, where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

Conclusion

In this disclosure, including the claims, the phrases "at least one of" or "one or more of" when referring to a list of items mean any combination of those items, including any single item. For example, the expressions "at least one of A, B, or C," "at least one of A, B, and C," "one or more of A, B, or C," and "one or more of A, B, and C" cover the possibilities of:

only A, only B, only C, a combination of A and B, A and C, B and C, and the combination of A, B, and C. This can include more or fewer elements than just A, B, and C. Additionally, the terms "comprise," "comprises," "comprising," "include," "includes," and "including" are intended to be open-ended and non-limiting. These terms specify essential elements or steps but do not exclude additional elements or steps, even when a claim or series of claims includes more than one of these terms.

Although operations, steps, instructions, blocks, and similar elements (collectively referred to as "steps") are shown or described in the drawings, descriptions, and claims in a specific order, this does not imply they must be performed in that sequence unless explicitly stated. It also does not imply that all depicted operations are necessary to achieve desirable results. In the drawings, descriptions, and claims, extra steps can occur before, after, simultaneously with, or between any of the illustrated, described, or claimed steps. Multitasking, parallel processing, and other types of concurrent processing are also contemplated. Furthermore, the separation of system components or steps described should not be interpreted as mandatory for all implementations; also, components, steps, elements, etc. can be integrated into a single implementation or distributed across multiple implementations.

While this disclosure has been detailed and illustrated through specific embodiments and examples, it should be understood by those skilled in the art that numerous variations and modifications can perform equivalent functions or achieve comparable results. Such alternative embodiments and variations, even if not explicitly mentioned but that achieve the objectives and adhere to the principles disclosed herein, fall within the spirit and scope of this disclosure. Accordingly, they are envisioned and encompassed by this disclosure and are intended to be protected under the associated claims. In other words, the present disclosure anticipates combinations and permutations of the described elements, operations, steps, methods, processes, algorithms, functions, techniques, modules, circuits, and so on, in any conceivable order or manner—whether collectively, in subsets, or individually—thereby broadening the range of potential embodiments.

What is claimed is:

1. A system comprising one or more graphics processing units (GPUs) configured for matrix multiplication and a controller implemented in one or more central processing units (CPUs) separate from the one or more GPUs, wherein the one or more GPUs are configured to:

store a routing matrix and a traffic matrix, wherein the routing matrix represents a topology of a network of a plurality of routers interconnected by a plurality of links and includes rows corresponding to the plurality of links, columns corresponding to router pairs of the plurality of routers, and binary entries indicating whether a specific link is part of a path of a given router pair, and wherein the traffic matrix includes traffic demands between the router pairs replicated to align with the columns of the routing matrix, receive, from the controller, a request for one or more cuts in the network with the one or more cuts represented in a path-selective traffic vector streamed from the controller, the path-selective traffic vector comprising binary entries that mask out any of the plurality of links associated with the one or more cuts and to shape the traffic demands between router pairs, perform an element-wise multiplication of the path-selective traffic vector with the traffic matrix to obtain a refined traffic matrix due to the one or more cuts, such that traffic demands corresponding to the one or more cuts are zeroed out in the refined traffic matrix, and multiply the routing matrix by the refined traffic matrix to obtain a link loading vector representing traffic on each of the plurality of links based on the one or more cuts.

2. The system of claim 1, wherein the processing hardware is further configured to provide the link loading vector to the controller.

3. The system of claim 1, wherein the one or more GPUs are configured to process a plurality of path-selective traffic vectors corresponding to a plurality of cut scenarios concurrently against the routing matrix and the traffic matrix.

4. The system of claim 1, wherein the binary entries of the routing matrix are stored as bit-packed values in memory of the one or more GPUs, with multiple binary entries packed into a single byte or word, and wherein the one or more GPUs are configured to perform bitwise operations on the bit-packed values during the multiplying.

5. The system of claim 1, wherein the traffic demands are Layer 3 (L3) Internet Protocol (IP) traffic between the routers, and wherein the plurality of links are optical connections at Layer 0 (LO).

6. The system of claim 1, wherein multiplication in the processing hardware utilizes sparse-matrix vector multiplication (SpMV) with parallelizes computations by leveraging sparsity, focusing processing power only on non-zero elements, based on a size of the network.

7. The system of claim 1, wherein the routing matrix and the traffic matrix are stored as a plurality of square matrices and a residual matrix, based on a size of the network.

8. The system of claim 1, wherein the network includes multiple layers, and wherein the processing hardware is configured to utilize a dependency graph to model fault propagation between the multiple layers where nodes in the dependency graph represent network elements and edges capture a dependency relationship between the network elements, such that a fault on a lower layer identifies upper layer impact.

9. A method comprising steps of:

storing a routing matrix and a traffic matrix in one or more graphics processing units (GPUs) configured for matrix multiplication, the one or more GPUs in communication with a controller implemented in one or more central processing units (CPUs) separate from the one or more GPUs, wherein the routing matrix represents a topology of a network of a plurality of routers interconnected by a plurality of links and includes rows corresponding to the plurality of links. columns corresponding to router pairs of the plurality of routers, and binary entries indicating whether a specific link is part of a path of a given router pair, and wherein the traffic matrix includes traffic demands between the router pairs replicated to align with the columns of the routing matrix;;

receiving, at the one or more GPUs from the controller, a request for one or more cuts in the network, the one or more cuts represented in a path-selective traffic vector streamed from the controller, the path-selective traffic vector comprising binary entries that mask out any of the plurality of links associated with the one or more cuts and shape the traffic demands between router pairs;

performing, by the one or more GPUs, an element-wise multiplication of the path-selective traffic vector with the traffic matrix to obtain a refined traffic matrix due to the one or more cuts, such that traffic demands corresponding to the one or more cuts are zeroed out in the refined traffic matrix; and multiplying the routing matrix by the refined traffic matrix to obtain a link loading vector representing traffic on each of the plurality of links based on the one or more cuts.

10. The method of claim 9, wherein the steps further include providing the link loading vector to the controller.

11. The method of claim 9, wherein the one or more GPUs process a plurality of path-selective traffic vectors corresponding to a plurality of cut scenarios concurrently against the routing matrix and the traffic matrix.

12. The method of claim 9, wherein the storing comprises storing the binary entries of the routing matrix as bit-packed values in memory of the one or more GPUs, with multiple binary entries packed into a single byte or word, and wherein the multiplying comprises performing bitwise operations on the bit-packed values.

13. The method of claim 9, wherein the traffic demands are Layer 3 (L3) Internet Protocol (IP) traffic between the routers, and wherein the plurality of links are optical connections at Layer 0 (L0).

14. The method of claim 9, wherein the multiplying utilizes sparse-matrix vector multiplication (SpMV) with parallelizes computations by leveraging sparsity, focusing processing power only on non-zero elements, based on a size of the network.

15. The method of claim 9, wherein the storing includes dividing the routing matrix and the traffic matrix into a plurality of square matrices and a residual matrix, based on a size of the network.

16. A non-transitory computer-readable medium comprising instructions that, when executed, cause one or more graphics processing units (GPUs) configured for matrix multiplication, the one or more GPUs in communication with a controller implemented in one or more central processing units (CPUs) separate from the one or more GPUs, to perform steps of:

storing a routing matrix and a traffic matrix, wherein the routing matrix represents a topology of a network of a plurality of routers interconnected by a plurality of links and includes rows corresponding to the plurality of links, columns corresponding to router pairs of the plurality of routers, and binary entries indicating whether a specific link is part of a path of a given router pair, and wherein the traffic matrix includes traffic demands between the router pairs replicated to align with the columns of the routing matrix;

receiving, from the controller, a request for one or more cuts in the network, the one or more cuts represented in a path-selective traffic vector streamed from the controller, the path-selective traffic vector comprising binary entries that mask out any of the plurality of links associated with the one or more cuts and to shape the traffic demands between router pairs;

performing, by the one or more GPUs, an element-wise multiplication of the path-selective traffic vector with the traffic matrix to obtain a refined traffic matrix due to the one or more cuts, such that traffic demands corresponding to the one or more cuts are zeroed out in the refined traffic matrix; and multiplying the routing matrix by the refined traffic matrix to obtain a link loading vector representing traffic on each of the plurality of links based on the one or more cuts.

17. The non-transitory computer-readable medium of claim 16, wherein the steps further include providing the link loading vector to the controller.

18. The non-transitory computer-readable medium of claim 16, wherein the one or more GPUs process a plurality of path-selective traffic vectors corresponding to a plurality of cut scenarios concurrently against the routing matrix and the traffic matrix.

19. The non-transitory computer-readable medium of claim 16, wherein the storing comprises storing the binary entries of the routing matrix as bit-packed values in memory of the one or more GPUs, with multiple binary entries packed into a single byte or word, and wherein the multiplying comprises performing bitwise operations on the bit-packed values.

20. The non-transitory computer-readable medium of claim 16, wherein the traffic demands are Layer 3 (L3) Internet Protocol (IP) traffic between the routers, and wherein the plurality of links are optical connections at Layer 0 (L0).

* * * * *